Nov. 10, 1936.    W. E. McDONNELL    2,060,421
OPHTHALMIC MOUNTING FOR RIMLESS EYEGLASSES
Filed Oct. 28, 1935    2 Sheets—Sheet 1
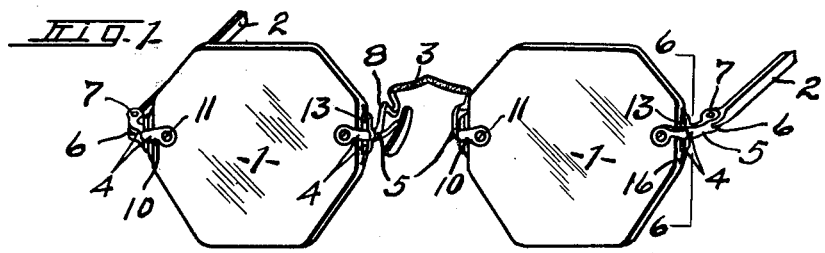
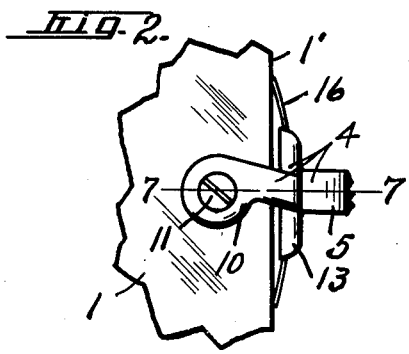
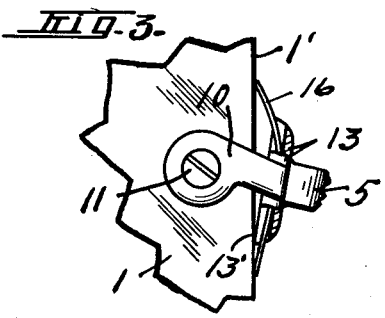
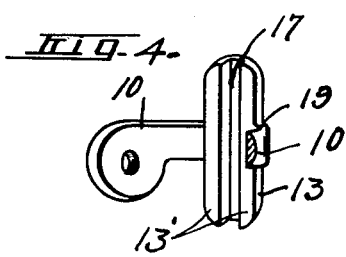
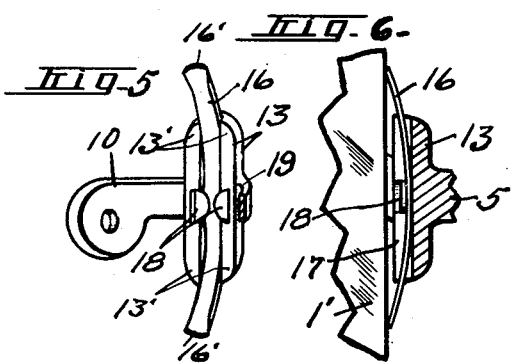
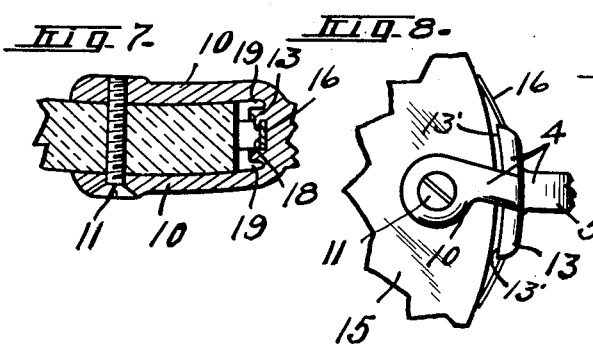
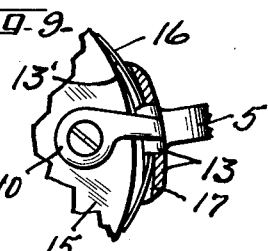
INVENTOR
WM. E. McDONNELL
BY
Theodore Simonton
ATTORNEY
WITNESS
J. J. Mains

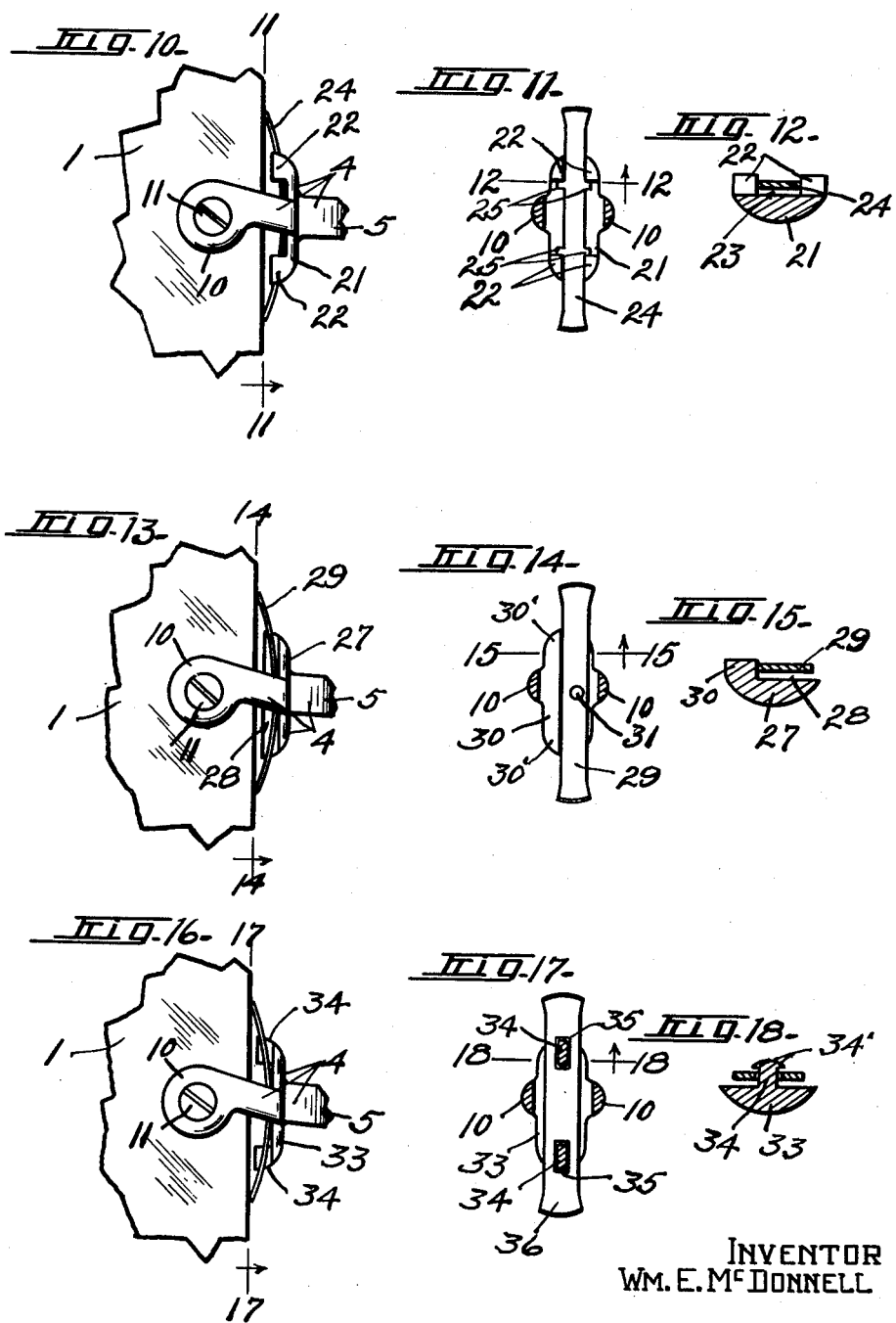

UNITED STATES PATENT OFFICE 2,060,421

OPHTHALMIC MOUNTING FOR RIMLESS EYEGLASSES

William E. McDonnell, Rochester, N. Y., assignor to Shuron Optical Company, Inc., Geneva, N. Y., a corporation of New York Application October 28, 1935, Serial No. 47,148

16 Claims. (Cl. 88—47)

This invention relates to ophthalmic mountings for rimless eye glasses, spectacles or the like. The invention particularly refers to new and useful improvements in the construction of a strap for connecting the temples and the nose piece or bridge to the lens and is a continuation in part of my co-pending application Serial No. 748,099, filed October 12, 1934.

An object of the invention is to provide a mounting for rimless eye glasses or spectacles wherein the connecting means or strap is yieldingly connected with the lens to permit relative movement of the lens and strap within certain limits whereby the lens is enabled to withstand greater strains or sudden shocks or jars without breaking.

Another object of the invention is to provide a mounting of the above mentioned class with resilient means for yieldingly but firmly maintaining the lenses in predetermined alignment with each other.

In carrying out the above mentioned objects, I have provided the connecting means or strap for securing the bridge or nose piece and the temples to rimless lenses with an auxiliary spring shoe member mounted intermediate the non-resilient strap shoe and the adjacent edge portion of the lens with the ends of the spring shoe normally bearing against the rims at respective sides of the plane passing through the glass screw substantially normal to said edge of the lens.

A more specific object of the invention is to provide an improved manner of securing the auxiliary spring shoe to the strap.

Another specific object of the invention resides in providing a lens mounting of the above mentioned class which permits slight variation in drilling the screw holes in the lens.

A further object of the invention is to provide a lens mounting with ears of maximum length whereby the same may be readily adjusted for lenses of various thicknesses and transverse curvatures.

Other objects and advantages pertaining to the details of the structure and to the form and relation of the parts thereof will more fully appear from the following description taken in connection with the accompanying drawings in which:

Figure 1 is a perspective view of a pair of rimless spectacles with my novel lens mounting strap associated therewith.

Figure 2 is an enlarged fragmentary side elevation of a rimless lens with my novel temple or nose piece mounting connected therewith.

Figure 3 is a side elevation partly broken away showing the mounting of Figure 2 in its fully tilted position.

Figure 4 is a fragmentary perspective view of my novel mounting strap structure and with the auxiliary shoe or spring element omitted.

Figure 5 is a fragmentary perspective view of my novel mounting strap structure with the auxiliary shoe or spring element operatively connected therewith.

Figure 6 is a partial sectional view taken on line 6—6, Figure 1.

Figure 7 is an enlarged detail sectional view taken on line 7—7, Figure 2.

Figure 8 is an enlarged fragmentary side elevation of a lens having circular contour with my improved ophthalmic mounting connected therewith.

Figure 9 is a fragmentary side elevation showing the mounting of Figure 8 partly broken away and in its fully tilted position.

Figure 10 is an enlarged fragmentary side elevation of a rimless lens with a modified form of my improved ophthalmic mounting connected therewith.

Figure 11 is a sectional view taken on line 11—11, Figure 10.

Figure 12 is an enlarged sectional view taken on line 12—12, Figure 11.

Figure 13 is a view similar to Figure 10 illustrating a further modification of my novel lens mounting.

Figure 14 is a sectional view taken on line 14—14, Figure 13.

Figure 15 is an enlarged transverse sectional view taken on line 15—15, Figure 14.

Figure 16 is a side elevation of a portion of a lens illustrating a still further modification of my novel lens mounting associated therewith.

Figure 17 is a sectional view taken on lines 17—17, Figure 16.

Figure 18 is an enlarged transverse sectional view taken on line 18—18, Figure 17.

In Figure 1 of the drawings, I have illustrated a pair of spectacles comprising lenses 1, temple bars 2 and a bridge or nose piece 3. The temple bars 2 and nose piece 3 are operatively connected with the respective sides of the lenses 1 by my improved ophthalmic mounting strap 4. The lenses 1, in this instance, are octagonal in outline in that they are provided with four pairs of substantially straight parallel sides.

Each of my novel lens mountings 4 comprises a saddle portion 5 which when used to connect the temple bar with the lens, has one end thereof bifurcated as at 6 for the reception of one end of the temple bar 2 which is pivotally connected to the bifurcated end by a screw or rivet 7. If the mounting member 4 is used to secure the bridge or nose piece 3 to the lens, the saddle portion 5 is secured to or made integral with a corresponding arm 8 of the bridge or nose piece. The saddle portion 5 of each mounting member 4 is provided with a pair of spaced ears 10 adapted to receive the lens therebetween and which are provided with aligned openings for the reception of a screw 11 by which the mounting member is secured to a lens 1. The hole in one of the ears 10 is preferably threaded for receiving the threaded end of the screw 11 in the usual manner except that the screw is not drawn tight enough to cause the ears to firmly grip the sides of the lens.

The strap 4, whether used for connecting a temple bar or the nose piece with a lens, is provided with a rigid shoe 13 which extends laterally from opposite sides of the saddle portion 5, in a plane substantially coincident with the plane of the lens with the inner face of the shoe 13 arranged with substantially the same contour as that of the adjacent portion of the rim of the lens. For instance, if the portion of the lens having the strap 4 connected thereto is provided with a substantially straight vertical edge portion, as illustrated in Figures 1, 2, 3 and 6, the shoe is formed substantially normal to the saddle portion 5 so that when the strap is mounted upon the lens, the inner face of the shoe will be in parallel relation with the adjacent edge as 1' of the lens.

If, on the other hand, the mounting is to be used with a lens as 15, Figure 8, having a general circular contour, the shoe is formed with a curvature conforming to that of the lens. That is, when the strap is to be used in connection with a circular lens, the shoe 13 is first formed with a curvature corresponding substantially to that of the largest diameter lens commonly employed, or a lens having a diameter of approximately 42 mm. and if the strap mounting is to be utilized in connection with a lens having a smaller diameter, the contour of the shoe is altered to conform to that of the lens by bending the shoe at the time the mounting is secured to the lens.

Bending the shoe to a contour substantially conforming to the contour of the adjacent portion of the lens rim not only provides for a uniform degree of pivotal movement of the strap for lens of different contour, but also provides for a uniform contact of the shoe with the lens without excessive flexing of the end portions of the auxiliary shoe or spring element 16 as will hereinafter be more apparent. It will be seen that by this construction, the ends of the shoe are the same distance from the edge of the lens as the center of the shoe, thus limiting the maximum pivoting or tilting of the strap and making it uniform whatever the contour of the edge of the lens with which it may be used.

The auxiliary shoe or spring element 16, as shown in Figures 1 to 3 and 5 to 9 inclusive, is a substantially flat arcuate member composed preferably of spring steel or other suitable tempered metal and has the end portions thereof flattened as at 16' to provide a relatively broad bearing surface adapted to engage the adjacent edge of the lens.

The inner face of the rigid shoe 13 is provided, as shown in Figure 4, with a recess or groove 17 which extends longitudinally of the shoe from one end thereof to the other. The recess or groove 17 is of substantially the same width as the resilient shoe 16 to readily receive said resilient shoe therein. The groove or recess 17 is preferably of greater depth than the thickness of the auxiliary shoe or spring 16 to not only engage the sides of the spring during substantially the entire range of pivotal movement of the strap 4 for maintaining the spring against lateral displacement, but also to permit the end portions 13' of the rigid shoe 13 positioned at opposite sides of the spring to engage the edge of the lens upon pivotal movement of the strap in either direction without rigidly clamping the corresponding end portion of the spring against the lens as more clearly illustrated in Figures 3 and 9. The auxiliary shoe or spring 16 may be secured to the shoe 13 at substantially the center thereof by any suitable means as by peening or riveting a portion of the side walls of the groove 17 over the spring as at 18, Figure 5.

By referring to Figures 4, 5, and 7, it will be noted that the ears 10 are of less thickness than the shoe 13 which obviously is of sufficient thickness to accommodate the groove 17. These ears are preferably secured to or made integral with the outer side edge of the shoe 13 opposite the grooved or inner side thereof, so that the ears are not only of maximum length, but are normally spaced as at 19 from the inner adjacent vertical or longitudinal side edge of the shoe 13.

This structure not only provides ears of maximum length which permits the ears being more readily adjusted laterally for lenses of different thicknesses and degrees of convexity, but also adds to the appearance of the mounting by concealing beneath the ears that portion of the shoe adjacent the saddle 5, thereby leaving only the upper and lower end portions of the shoe exposed to view.

In mounting the strap 4 upon a lens, the hole in the glass for the screw 11 is drilled at a distance from the adjacent edge of the lens which is slightly less than the distance from the inner face of the shoe 13 to the holes for the screws in the ears 10 so that when the strap is mounted on the lens, the shoe member 13 will be spaced a relatively short distance from the edge of the lens as illustrated in Figures 2, 6, and 8 to permit a limited pivotal movement of the strap about the axis of the screw 11.

In other words, the screw hole in the lens is drilled sufficiently far from the edge of the lens to provide such a space between the inner face of the shoe 13 and the adjacent edge of the lens as to permit the strap to pivot or tilt through such an angle that the spring 16 will be fully floating and will be in contact with the shoe only near its center even when the shoe is tilted to the limit of its pivotal movement where the end portions 13' of the shoe engage the edge of the lens. This condition is illustrated in Figures 3 and 9 where it will be observed that the strap has been tilted so far that the corresponding end 13' of the shoe is in engagement with the edge of the lens but nevertheless, there is no sharp bend in the spring 16 and the spring is free substantially from its center to each end.

If the strap is too loosely fitted by drilling the screw hole in the lens too near the edge of the lens, an excessive pivotal movement of the strap may take place. In such case, when one of the end portions 13' of the shoe is in engagement with the edge of the lens, the adjacent end portion of the spring 16 may be engaged by the bottom of the groove 17 and the spring flattened thereby. Even in this extreme case, however, due to the groove 17 being of greater depth than the thickness of the spring, the outer end of the spring will be free to flex and yieldingly exert tension upon the lens. When the strap is rocked to an extreme position relative to the lens, it will be seen, therefore, that under no position of the strap of this invention, can the spring be rigidly clamped between the shoe and the edge of the lens, but the spring is free to flex under all pivotal positions of the strap member.

The auxiliary shoe or spring element 16 has the end portions thereof curved inwardly toward the lens so as to normally exert a uniform pressure upon the lens at equal distances either side of the plane passing through the screw hole normal to the edge of the lens for yieldingly maintaining the strap in its normal position in spaced relation to the lens.

It will be observed from the foregoing that although the strap is loosely connected to the lens by the screw 11 so that the strap is free to pivot about the screw as a center to a limited degree, the spring element 16 will yieldingly maintain the lens and strap in predetermined relation with each other and, therefore, the lenses of the corresponding spectacles will be maintained in alignment with each other.

In Figures 10, 11 and 12, I have illustrated a modified form of my novel strap shoe and the auxiliary shoe or spring element associated therewith. As illustrated, the rigid shoe as 21 has the inner longitudinal side thereof provided with two pairs of end members or lugs 22 arranged with one pair adjacent either end of the shoe. It will be seen, therefore, that these pairs of lugs 22 provide a pair of grooves or recesses 23 therebetween arranged one at either end of the shoe which, like the recesses 17 are of greater depth than the width of the spring or auxiliary shoe as 24 so that when the strap 4 is rocked about the screw 11, the inner end surfaces of these lugs will engage the adjacent edge of the lens for limiting the pivotal movement of the strap and at the same time, the spring is free to flex under all pivotal positions of the strap member.

The spring 24 is constructed, in this instance, similar to the spring 16 with the exception that the intermediate portion thereof is provided with two pairs of laterally disposed shoulders 25 arranged one pair adjacent the inner edge of the corresponding pair of lugs 22 for limiting the longitudinal movement of the spring relative to the shoe 21 and thereby functioning when the strap 4 is secured to a lens to cooperate with said lens in maintaining the spring in the operative position in the shoe 21.

In the structure shown in Figures 13, 14 and 15, the shoe as 27 of the strap 4 has one side portion of the inner face thereof removed to provide a recess 28 extending longitudinally of the shoe for receiving the spring or auxiliary shoe 29. In the structures shown in these views, it will be noted that the shoe is provided with a longitudinally extending rib 30 arranged adjacent one side only of the spring and which is adapted to engage the adjacent edge of the lens for limiting the pivotal movement of the strap by the contact of the end portion 30' of the rib with the lens. The spring 29 is constructed similarly to the spring 16 except that this spring is slightly wider than the spring 16 and is secured at its center to the shoe 27 by a screw or rivet 31 as shown in Figure 14.

In Figures 16, 17 and 18, I have illustrated a still further modified form of my novel ophthalmic mounting which consists in providing the shoe as 33 of the strap with a pair of inwardly extending lugs or short ribs 34 arranged in longitudinal spaced relation, one adjacent either end of the shoe. These lugs are relatively narrow and extend through a corresponding slot or aperture 35 provided in the spring or auxiliary shoe 36. This spring or shoe 36 is slightly wider than the spring 29 shown in Figures 13, 14 and 15 to readily receive the lugs 34 therethrough. At the same time, the spring is adapted to freely flex between the adjacent portions of the ears 10.

These lugs or ribs 34 are constructed to extend when the central portion of the spring or auxiliary shoe 36 is in contact with the inner face of the shoe, a relatively short distance inwardly beyond the adjacent portion of the spring and are upset as at 34', Figure 18, to extend laterally over the adjacent portion of the spring for maintaining the spring thereon. It will be observed in this structure, that when the strap 4 is swung about the screw 11 as a pivot, the inner end portions of the lugs 34 will contact with the adjacent edge of the lens for limiting this pivotal movement of the strap. The distance from the riveted or upset end 34' of each lug to the adjacent inner side of the shoe 33 is such that when the strap is moved to its extreme position in either direction, the spring as in the previously described constructions will not contact the inner face of the shoe adjacent the end thereof and is, therefore, free to flex a limited degree under all pivotal positions of the strap member.

It will now be observed that while I have shown certain modifications of my invention, still further modifications may be readily produced. For instance, the lugs 22 shown in Figures 10, 11 and 12, or lugs 34 shown in Figures 16, 17 and 18 may, instead of being made integral with the corresponding shoe, be separate members secured in any suitable manner to the shoe.

Furthermore, these members instead of being substantially rectangular in plan view, may be circular pins driven or otherwise secured in corresponding apertures provided in the shoe. Also, it will be observed that the lugs 34 may be extended longitudinally toward each other to provide a continuous or substantially continuous lug or rib extending longitudinally of the shoe, while the apertures 35 may be correspondingly enlarged to receive the lugs or rib thus formed.

Although the construction and operation of the device disclosed herein and the various modifications thereof, are particularly simple, practical and efficient, it will be understood that various other changes in the details of the construction may readily be made without departing from the spirit of the invention as set forth in the appended claims.

I claim:

1. An ophthalmic mounting for connecting a nose or temple piece to a rimless lens comprising a strap member pivotally secured to the lens, said strap member having a shoe normally spaced from the adjacent edge of the lens, a spring interposed between the shoe and lens edge, said spring having the intermediate portion thereof spaced from said edge and contacting the intermediate portion of the shoe and the ends of said spring spaced from the ends of the shoe and slidably contacting said lens edge, and means provided on said shoe adjacent the ends thereof projecting therefrom towards the lens edge a distance greater than the thickness of the spring and normally spaced from said edge but adapted upon extreme relative pivotal movement of the lens and strap to directly contact with the edge of the lens for maintaining all portions of the spring free to flex under all pivotal positions of the strap member by preventing the spring from being rigidly clamped between the shoe and the lens.

2. An ophthalmic mounting for securing a nose or temple piece to a rimless lens comprising a strap member pivotally secured to the lens, said strap member having a shoe normally spaced from the lens, an arcuately shaped spring member of greater length than the shoe mounted independently of said nose or temple piece between the shoe and the lens in pressure engagement therewith for yieldingly maintaining the strap and lens against relative pivotal movement, said shoe being provided with a portion adjacent each end thereof normally spaced from the lens and projecting beyond the spring to directly contact with the edge of the lens upon extreme relative pivotal movement of the strap and lens for maintaining the spring from being rigidly clamped between the shoe and lens.

3. A mounting for a spectacle lens or the like comprising a strap member pivotally secured to the lens, said strap member being provided with a shoe normally spaced from the lens, and an arcuately shaped spring of greater length than the shoe mounted between the shoe and the lens, said shoe having a lengthwise recess, and means engaging the spring for securing the spring in said recess in pressure engagement with the lens, the spring and shoe being so related that the end portions of said spring are free to flex under all pivotal positions of the strap member.

4. A mounting for a spectacle lens or the like comprising a strap member pivotally secured to the lens, said strap member being provided with a shoe normally spaced from the lens, and an arcuately shaped spring of greater length than the shoe mounted between the shoe and the lens, said shoe having a lengthwise recess for receiving the spring therein, said recess being of greater depth than the thickness of the spring whereby the shoe will directly engage the lens upon extreme pivotal movement of the strap member, and means for maintaining the spring in said recess.

5. A mounting for a spectacle lens or the like comprising a strap member pivotally secured to the lens, said strap member being provided with a shoe having a contour on the inside thereof conforming substantially to the contour of the adjacent portion of the rim of the lens, and an arcuately shaped spring of greater length than the shoe mounted between the shoe and the lens, said shoe having a lengthwise groove for receiving the spring which is of greater depth than the thickness of the spring whereby the shoe will directly engage the lens upon extreme pivotal movement of the strap member, the side walls of said groove having a portion thereof extended over the spring for securing said spring in position.

6. A mounting for a spectacle lens or the like comprising a strap member pivotally secured to the lens, said strap member being provided with a shoe having a contour on the inside thereof conforming substantially to the contour of the adjacent portion of the rim of the lens, and an arcuately shaped spring of greater length than the shoe mounted between the shoe and the lens, said shoe having a lengthwise groove for receiving the spring which is of greater depth than the thickness of the spring whereby the shoe will directly engage the lens upon extreme pivotal movement of the strap member, and means for maintaining the spring in said groove.

7. A mounting for connecting a nose or temple piece to a spectacle lens or the like comprising a strap member pivotally secured to the lens, said strap member being provided with a shoe normally spaced from the lens and an arcuately shaped spring of greater length than the shoe mounted independently of said nose or temple piece between the shoe and the lens, said shoe having a pair of spaced lugs at each end thereof extending inwardly therefrom toward the edge of the lens, and adapted to receive the spring therebetween, said lugs being of greater length than the thickness of the spring and normally spaced from the lens whereby they will directly engage the lens upon extreme pivotal movement of the strap member and maintain the spring from being rigidly clamped between the shoe and lens.

8. A device as in claim 7, wherein the spring is provided with lateral projections engaging the lugs for maintaining the spring in operative relation with the shoe.

9. A mounting for connecting a nose or temple piece to a spectacle lens or the like comprising a strap member pivotally secured to the lens, said strap member being provided with a shoe normally spaced from the lens and an arcuately shaped spring of greater length than the shoe mounted independently of said nose or temple piece between the shoe and the lens, said shoe having a lug at each end thereof extending inwardly therefrom in the plane of the edge of the lens, each of said lugs being of greater length than the thickness of the spring and normally spaced from said edge, whereby they will directly engage the lens upon extreme pivotal movement of the strap member and prevent the spring from being rigidly clamped between the shoe and the lens.

10. A device as in claim 9 wherein said lugs and spring have means co-acting for maintaining the spring in operative relation with the shoe.

11. A mounting for a spectacle lens or the like comprising a strap member pivotally secured to the lens, said strap member being provided with a shoe normally spaced from the lens, and an arcuately shaped spring of greater length than the shoe mounted between the shoe and the lens, said shoe having a lug at each end thereof extending inwardly therefrom toward the lens, said spring being provided with longitudinally spaced apertures receiving the lugs therethrough, said lugs being of greater length than the thickness of the spring and having the ends thereof upset for maintaining the spring thereon.

12. An ophthalmic mounting for connecting a nose or temple piece to a rimless lens having a substantially smooth continuous marginal edge comprising a strap member fixedly connected with said piece and having a shoe portion, means pivotally connecting the strap member to the lens with said shoe portion arranged in spaced relation to the edge thereof, a spring interposed between the shoe and lens edge, said spring having the intermediate portion thereof spaced from said edge and contacting the intermediate portion of the shoe and the ends thereof spaced from the shoe ends and slidably contacting said lens edge, said spring having a longitudinally extending aperture therethrough, and a laterally extending holding element projecting inwardly from the shoe through said spring aperture, said holding element having the outer portion thereof extended over the spring for maintaining the spring thereon and normally spaced from said lens edge but adapted to directly engage the lens edge upon extreme relative pivotal movement of the strap member and lens, said outer extended portion being spaced from the shoe a distance greater than the thickness of the spring to maintain said spring from being rigidly clamped between the shoe and lens whereby said spring may freely flex under all pivotal positions of the strap member.

13. A mounting for a spectacle lens or the like, comprising a strap member pivotally secured to the lens, said strap member being provided with a shoe normally spaced from the lens and an arcuately shaped spring mounted between the shoe and the lens, said shoe having a longitudinally extending rib projecting inwardly therefrom toward the lens in cooperative relation with the spring for maintaining the spring in operative relation with the shoe, said rib being extended inwardly a greater distance from the shoe than the thickness of the spring to contact directly with the edge of the lens upon extreme pivotal movement of the strap member, whereby said spring may freely flex under all pivotal positions of the strap member.

14. In a lens mounting, a strap member comprising a shoe, lens screw engaging ears projecting forwardly from said shoe, a longitudinal groove along the inner surface of said shoe, and a spring mounted in said groove, said groove and said spring being of less width than the spacing between said lens screw engaging ears, whereby the edge of the lens is prevented from entering said groove and clamping said spring upon pivotal movement of the strap member.

15. In a lens mounting, a strap member comprising a shoe, lens screw engaging ears projecting forwardly from said shoe, a longitudinal groove along the inner surface of said shoe and extending the entire length thereof, and a spring of greater length than the shoe mounted in said groove and secured therein only adjacent its center, said groove and said spring being of less width than the spacing between said lens screw engaging ears, whereby the edge of the lens is prevented from entering said groove and clamping said spring upon pivotal movement of the strap member.

16. In a lens mounting, a strap member comprising a shoe, lens screw engaging ears projecting outwardly and forwardly from the opposite outer sides of said shoe at points spaced rearwardly from the inner surface of said shoe, a longitudinal groove along said inner surface of the shoe, and an arcuately shaped spring mounted in said groove and secured to said shoe substantially at the center thereof.

WILLIAM E. McDONNELL.